L. METESSER.
FURNACE.
APPLICATION FILED JUNE 16, 1919.

1,328,883.

Patented Jan. 27, 1920.
8 SHEETS—SHEET 2.

Inventor
Lewis Metesser
By C. L. Parker
Attorney

L. METESSER.
FURNACE.
APPLICATION FILED JUNE 16, 1919.

1,328,883.

Patented Jan. 27, 1920.
8 SHEETS—SHEET 8.

Inventor
Lewis Metesser

By C. L. Parker, Attorney

UNITED STATES PATENT OFFICE.

LEWIS METESSER, OF NEW ORLEANS, LOUISIANA.

FURNACE.

1,328,883.          Specification of Letters Patent.          Patented Jan. 27, 1920.

Application filed June 16, 1919. Serial No. 304,526.

*To all whom it may concern:*

Be it known that I, LEWIS METESSER, a citizen of the United States, residing at New Orleans, in the parish of Orleans and State of Louisiana, have invented certain new and useful Improvements in Furnaces, of which the following is a specification.

This invention relates to new and useful improvements in furnaces and more particularly to that type of furnace known as underfeed stoker, and has for its object the provision of such a furnace in which the amount of unconsumed combustible material passing out with the ash is reduced to a minimum.

A further object is to provide a furnace of this type in which the loss of time due to the necessity for cleaning of the furnace is reduced to a minimum.

A still further object is the provision of a furnace of this type, the parts of which are readily interchangeable and cheaply constructed.

These and other objects I attain by the combination and construction shown in the accompanying drawings, which will be considered in an illustrative and not a limiting sense, and in which:

Fig. 1ᵃ is a front elevation of a furnace embodying my invention, a portion of the front wall being broken away for the purpose of clearness;

Figure 1:
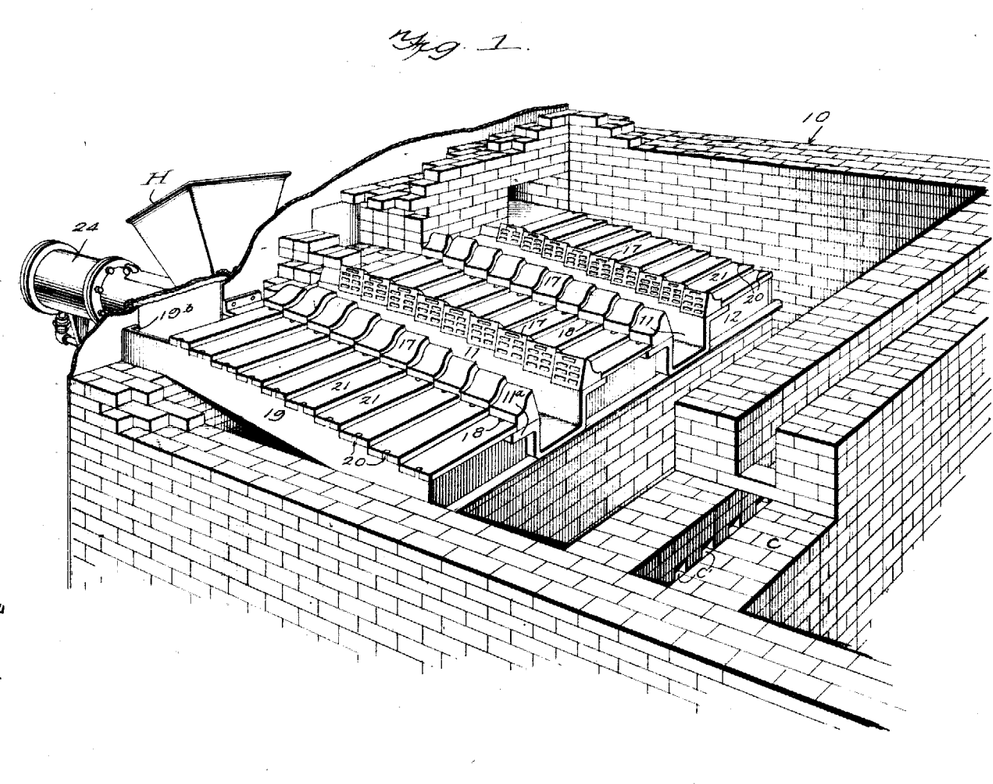
Figure 1 is a perspective view of a furnace embodying my invention.
Figure 1A:
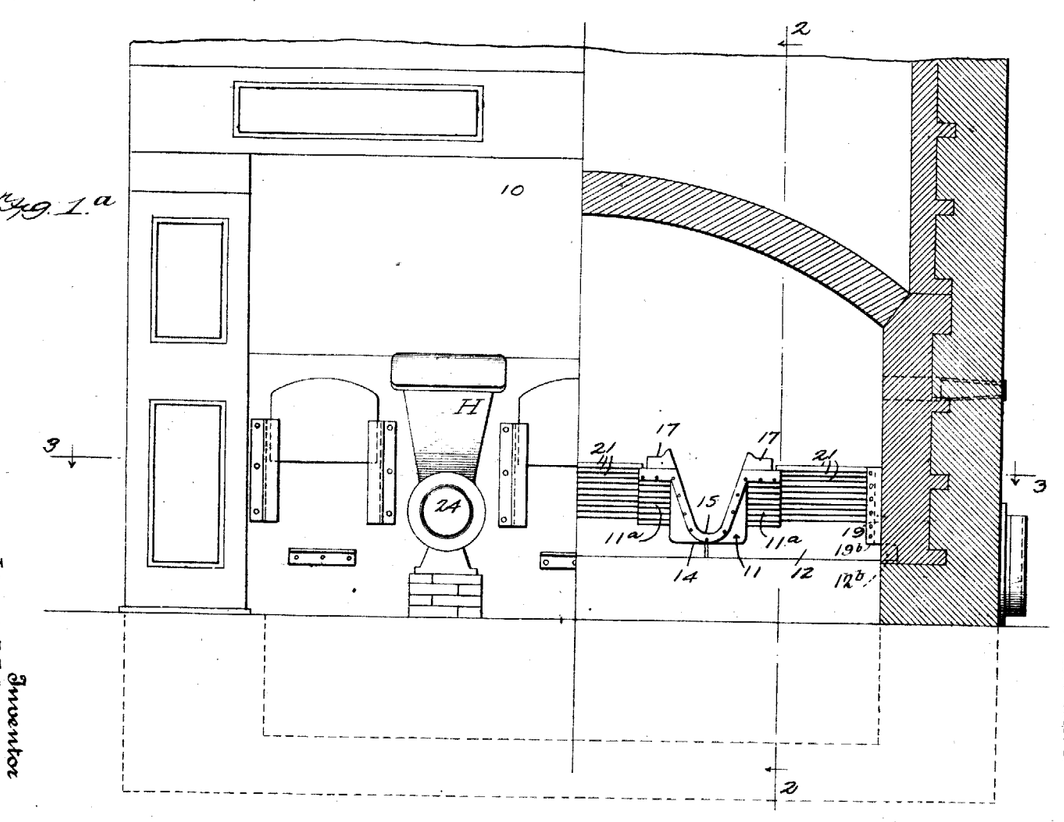
Figure 2:
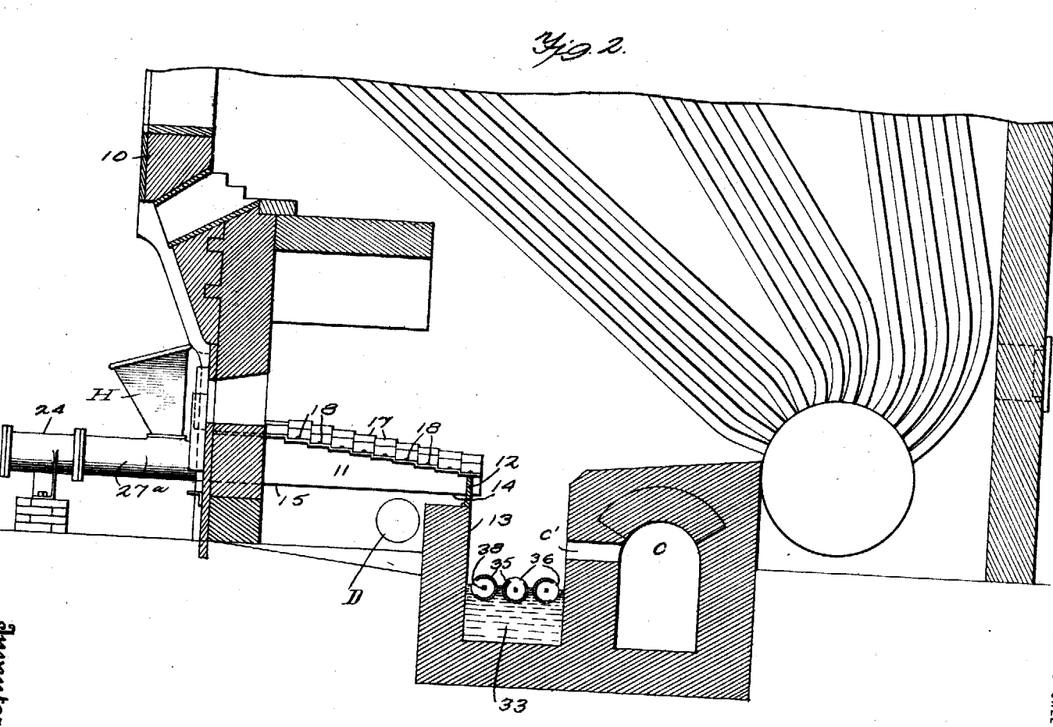
Fig. 2 is a section on the line 2—2 of Fig. 1.
Figure 3:
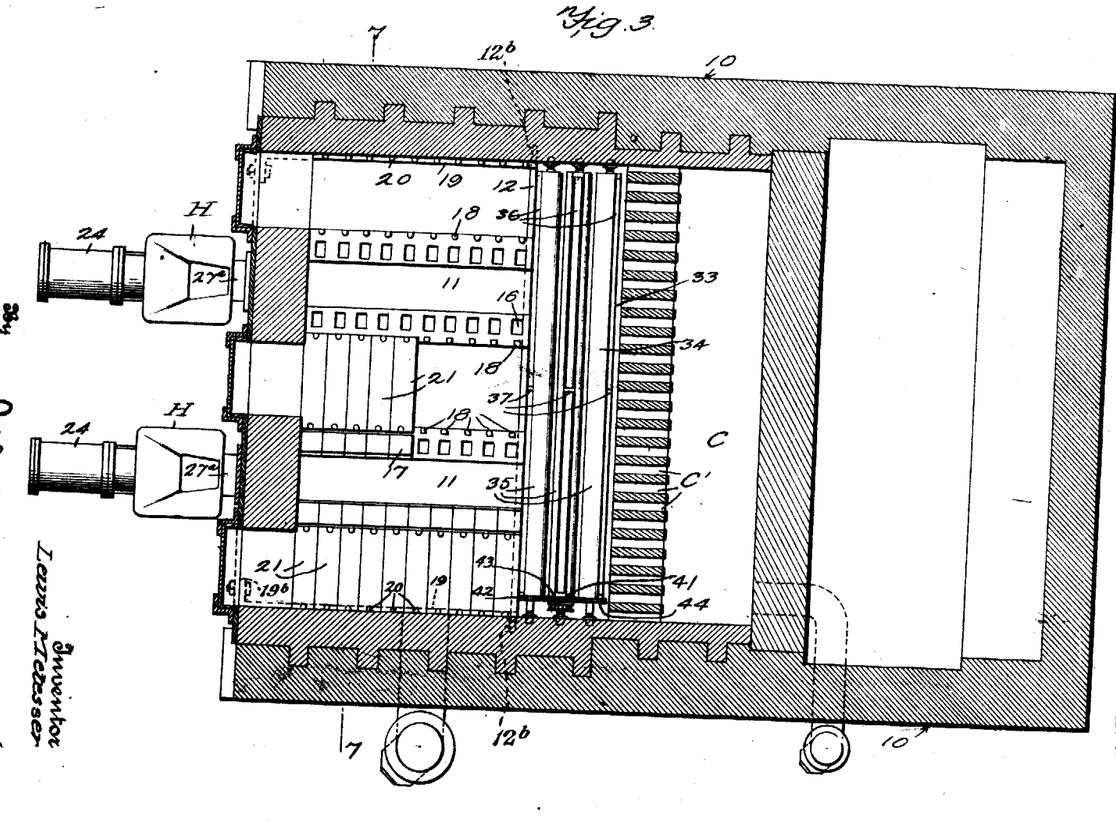
Fig. 3 is a section on line 3—3 of Fig. 1.
Figure 4:
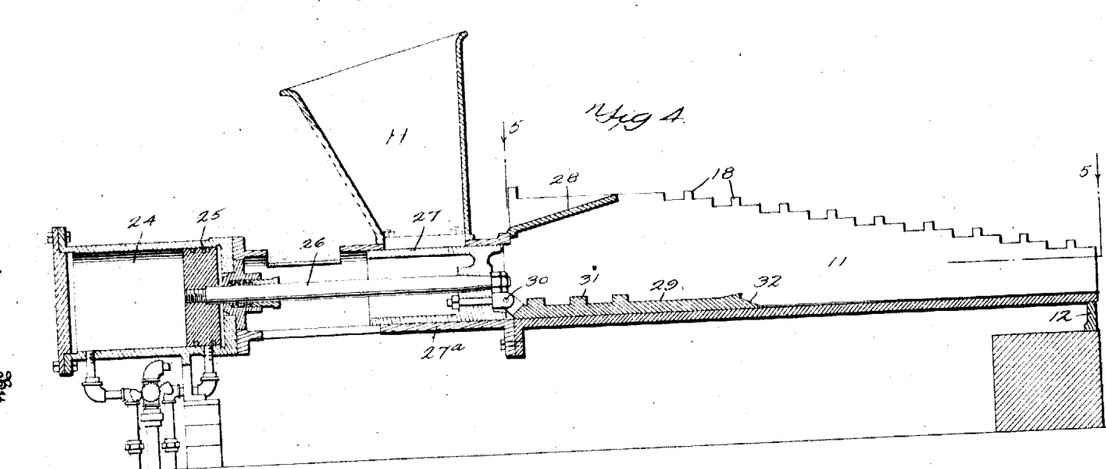
Fig. 4 is an enlarged vertical section through the retort showing the fuel feeding mechanism.
Figure 5:
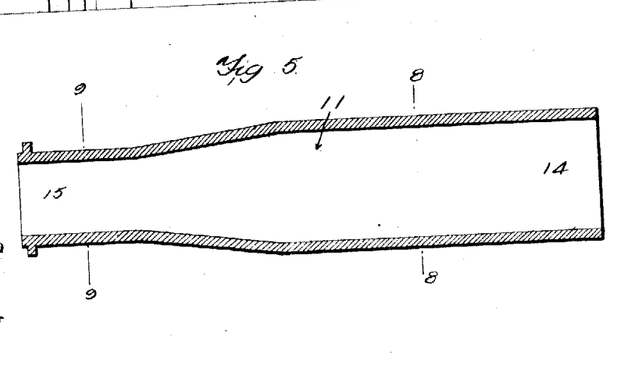
Fig. 5 is a section on the line 5—5 of Fig. 4.
Figure 6:
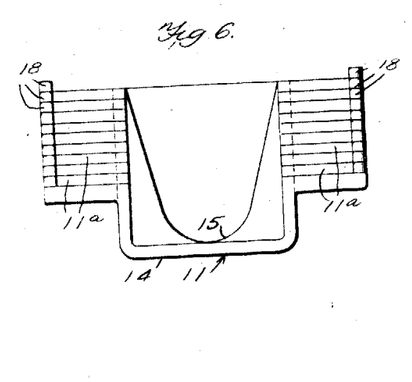
Fig. 6 is an enlarged end elevation of the retort.
Figure 7:
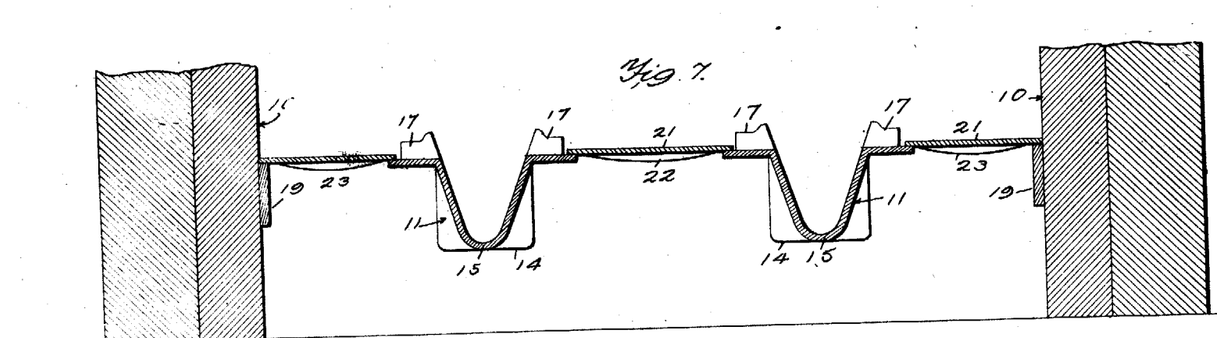
Fig. 7 is a section on the line 7—7 of Fig. 3.

Referring now more particularly to the drawings, the numeral 10 indicates a boiler furnace as a whole. Mounted within the firebox of the furnace are retorts 11. The front ends of these retorts are bolted or otherwise secured to the fire front and wall 10ᵃ of the furnace, and the rear ends of the retorts are held in position by a plate 12 arranged transversely of the fire-box, the ends of this support being walled in the side walls of the furnace, and the lower edge resting upon the horizontal top of a cross wall 13 which wall forms the front end of a water sealed chamber hereinafter described. The plate 12 is provided with recesses 12ᵃ adapted to receive the rear ends of the retorts 11. the top of the rear end of the retort being substantially flush with the top of the support as is clearly shown in Fig. 1.

Figures 8, 9, 10, 11:
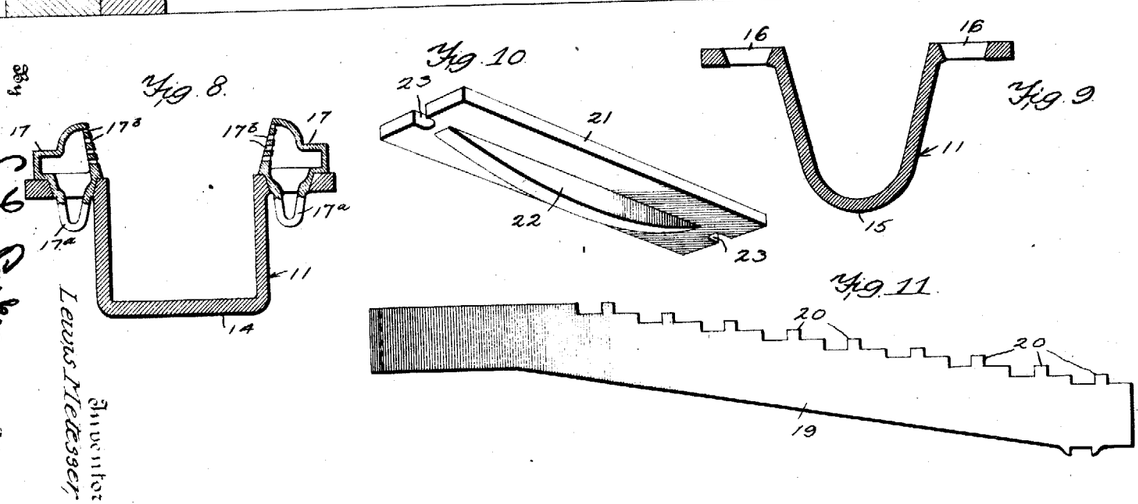
Fig. 8 is a section through the retort, taken on the line 8—8 of Fig. 5.
Fig. 9 is a similar section, taken on the line 9—9 of Fig. 5.
Fig. 10 is a perspective of one of the side and center plates.
Fig. 11 is a side elevation of one of the side bars.
Figure 12:
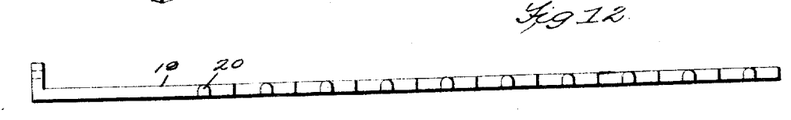
Fig. 12 is a plan view of the side bar.
Figure 13:
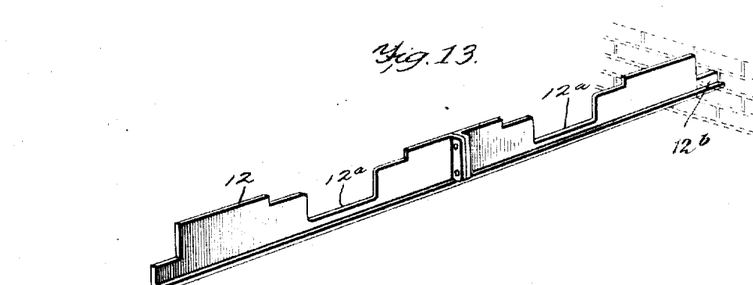
Fig. 13 is a perspective of the end support for the retort.
Figure 14:
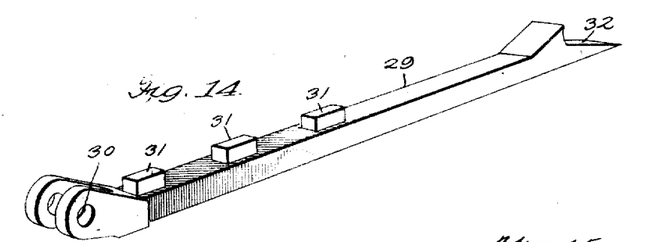
Fig. 14 is a perspective of the combined breaking and feeding bar.
Figure 15:
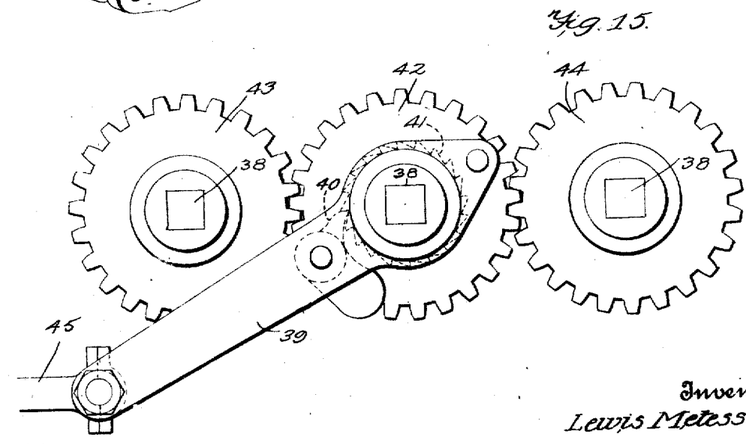
Fig. 15 is an end elevation of the operating mechanism for the ash supports.
Figure 16:
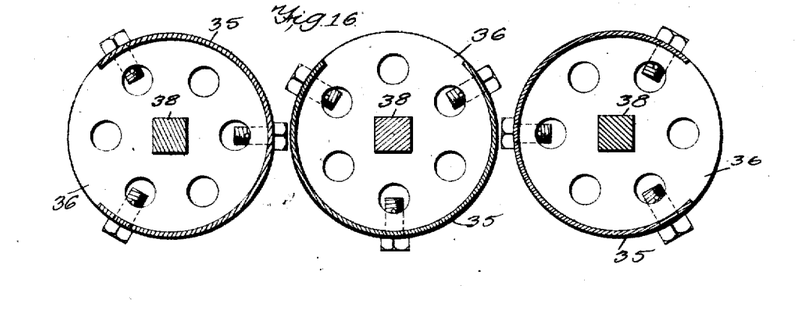
Fig. 16 is an enlarged sectional view of the ash supports.
Figure 17:
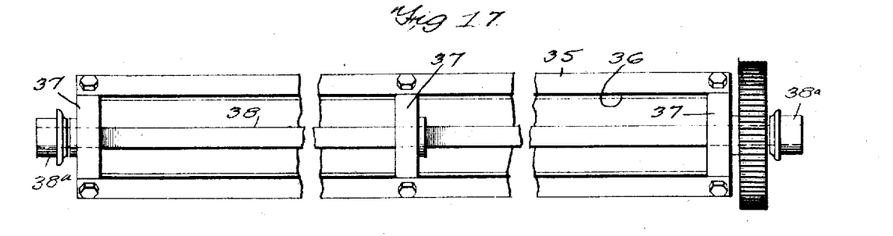
Fig. 17 is a plan view of the ash supports.
Figure 18:
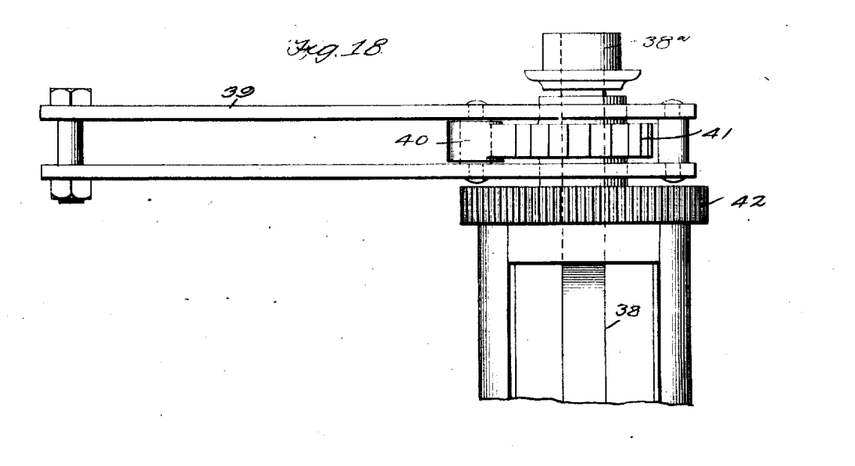
Fig. 18 is a detail view, showing the connection of the operating mechanism to the ash supports.

By referring to Figs. 2, 4, 5, 6, 8 and 9, it will be seen that the bottom 14 of the retort is horizontal throughout its entire length, and that the top of the retort slopes from front to back. The front of the retort is restricted, as at 15, this restricted portion being approximately V-shaped, as shown in Fig. 9, the base of the V spreading rearwardly to form an enlarged rear section which is approximately U-shaped, as shown in Fig. 8. The tops of the sides of the retort are turned at right angles forming shoulders 11ᵃ provided with horizontal steps 11ᵇ as clearly shown by Figs. 1, 2, 4 and 6, having openings 16 adapted to receive twyers 17. The steps 11ᵇ of the shoulders 11ᵃ of the retorts are also provided on their upper surfaces with lugs 18 for a purpose hereinafter to be described.

Mounted against the side walls of the furnace and suitably secured at their forward ends to the fire front and wall, as at 19ᵃ are side bars 19, the upper edge of the side bars being inclined rearwardly at the same angle as the upper edges of the retort, and the rear ends of the side bars resting upon the transverse support 12. These side bars are provided with steps 19ª similar to the steps 11ᵇ of the retorts having on their upper surfaces spaced lugs 20 corresponding in number and arrangement with the lugs 18 formed upon the retort. Spanning the space between the retort and the side wall are plates 21 suitably reinforced on their under sides, as at 22, and provided with notches 23 adapted to receive the lugs 18 of the retort and lugs 20 of the side supports, the ends of the plates resting upon the steps of the shoulders of the retort and the upper surface of the side bars. These plates are so arranged as to form a continuous, rearwardly inclined platform, as is clearly shown in Figs. 1 and 2.

Similar plates 21 are provided intermediate the retorts. It will thus be seen that the spaces between the side walls and the retorts and between the retorts themselves are provided with a continuous rearwardly inclined platform.

Means for feeding fuel to the furnace is shown as comprising a pressure cylinder 24, having mounted therein a piston 25 and provided with the usual means for governing the flow of the fluid into first one end and then the other of the cylinder. This piston 25 is provided with a piston rod 26, to the outer end of which is secured a ram head 27. This ram head works in conjunction with the usual hopper H to feed fuel from the hopper into the mouth of the retort.

Arranged within the forward end of the retort 11 is an angularly disposed deflecting plate 28, the purpose of which is to prevent piling up of the fuel at the front wall of the firebox. Means to insure against packing or wedging of the fuel under the deflecting plate 28 is provided, comprising a breaking bar 29, which operates along the interior of the horizontal bottom of the retort and rear end of ram case 27ª. This breaking bar is secured to the ram, as at 30, and therefore has the same stroke as the ram. Upon its upper surface and adjacent the head of the ram, the breaking bar is provided with lugs 31 which grip the fuel and cause it to shift. The rear end of the breaking bar is provided with a wedge portion 32 which aids in the rearward movement of the fuel bed and ashes.

It will be seen that between the front wall and the support 12 the base of the fire box and the plates 21 what is in effect a closed space is formed. Into this space is introduced a forced draft by any suitable means as at D, the draft passing through the open bottoms 17ª of the twyers 17 and out through the openings 17ᵇ thereof.

Adjacent the rear ends of the retorts and arranged therebelow is a water sealed chamber 33, in which are longitudinally arranged ash supports 34. These supports comprise cylindrical members 35 provided with a longitudinal opening 36. In the present illustration I have shown these cylindrical members as being supported by disks 37 mounted upon shafts 38, the ends of which are provided with sleeve disks 38ª mounted in suitable bearings in the side walls of the chamber, the tubular members being bolted or otherwise suitably secured to the disks. Means for rotating these disks is provided, comprising a lever 39, having mounted thereon a pivoted, weight-operated pawl 40, engaging a ratchet gear 41 suitably secured to one of the tubular members. The motion of this tubular member being transmitted to the other two tubular members through the medium of a gear 42 suitably secured to the tubular member and meshing with similar gears 43 and 44 secured to the remaining tubular members. It will be seen that when the lever 39 is oscillated in any manner, as by means of a rod 45, operated by hand or power as desired, the tubular members are rotated. In order that the power required to operate the rotary members may be reduced to a minimum, the openings in the tubular members are so arranged that but one is in operating position at a time.

The operation of my device is as follows:

Fuel being forced into the retort periodically or continuously as may be required by the pressure actuated ram 27, moves simultaneously upwardly and rearwardly from the impulse received by the ram and breaker bar 29, raising to the top of the level of the retort, piling up at the forward end of the retort being prevented by a deflector plate 28. Here the air necessary to combustion is applied by the twyers 17, and because of the peculiar construction of the retort these twyers are constantly supplying air to fresh fuel. Due to the tendency of the fuel to pile up, the fuel after leaving the deflector plate 28 will overflow and fall upon the plates 21, but does not become stagnant on these plates as the dragging effect of the moving edges of the main body of fuel in the retort will have a tendency to carry this overflow downwardly and rearwardly. It will readily be seen by those familiar with the art that by properly adjusting the fuel feed, the fuel arriving at the lower rearward end of the retort will be almost if not entirely consumed. To prevent the loss of any unconsumed fuel which may pass over the rear end of the retort, the rotary tubular members hereinbefore described have been provided. These members receive the falling ash and unconsumed particles and support them, the unconsumed particles being provided with air for combustion through the checkers "C"

through openings C' or from elsewhere. It will be understood that the opening C' of the checkers are but slightly above the level of the tubular members and that the major portion of the combustion takes place above these openings, the material below the openings being almost if not entirely ashes. Accordingly broadly speaking, nothing but ash accumulates upon the tubular members. The rotation of the tubular members brings the openings thereof into constant engagement with the bottom of the accumulating ashes for removal therefrom. To prevent the heat generated by the combustion above the tubular members from burning the members out and thus destroying them, they are partially or entirely submerged in water and are thus cooled as they are rotated.

It will be obvious to those familiar with the art that many changes of construction as regards size and shape of the particular elements may be made without departing in any sense from the spirit of the invention, and I accordingly do not limit myself to the specific structure herein shown and described.

Having thus described my invention, I claim:

1. In a furnace and in combination with the fire-box thereof, a retort having a horizontally disposed bottom arranged longitudinally of the fire-box, the top of said retort inclining downwardly toward the rear end thereof, side bars arranged against the side walls of the fire-box and having their forward ends secured to the fire front and wall thereof, the top of said side bars inclining rearwardly at the same angle of inclination as the tops of the retorts, lugs formed on the top of said side bars, lugs formed on the upper face of said retort, and plates spanning the space between said retort and said side bars provided with notches adapted to receive the lugs formed on said side bars and the upper face of said retort.

2. In a furnace and in combination with the fire-box thereof, a retort having an open top inclined toward the rear end thereof arranged longitudinally of the fire-box, said retort being provided with horizontally disposed upper faces having spaced openings formed therein, twyers mounted in said openings and having their discharge openings facing the open top of said retort, side bars mounted against the side walls of the fire-box having their upper faces inclined rearwardly at the same angle of inclination as the top of said retort, lugs formed on the upper face of said side bars and plates spanning the space between said retort and said side bars provided with notches adapted to receive the lugs formed on said side bars and said retort.

3. In a furnace and in combination with the fire-box thereof, a retort having an open top and open front and rear ends, said retort being arranged longitudinally of the fire-box, the bottom of said retort being horizontally disposed and restricted forwardly and diverging rearwardly and the top of said retort inclining downwardly toward the rear end thereof, the upper edges of said retort being provided with horizontally disposed shoulders, provided with spaced openings, twyers mounted in said openings having their discharge openings facing the open top of said retort, means for feeding fuel into the open front end of said retort, and means for preventing piling up of the fuel at the front end of the retort.

4. In a furnace, and in combination with the fire-box thereof, a retort arranged longitudinally of said fire-box, the top of said retort being inclined downwardly toward the rear end thereof, a transverse wall in said fire-box, a support arranged upon said transverse wall and having its ends walled in the side walls of the fire-box, said support being provided with a recess adapted to receive the rear end of said retort, side bars arranged adjacent the side walls of said fire-box, the upper faces of said side bars being inclined rearwardly at the same angle of inclination as the upper edges of said retort, lugs formed on the upper edges of said side bars, similar lugs formed on the upper edges of the retort, and plates spanning the space between said retort and said side bars, provided with notches adapted to receive the lugs formed on said bars and the upper face of said retort.

5. In a furnace and in combination with the fire-box, a retort arranged longitudinally of said fire-box, the top of said retort being inclined toward the rear end thereof and provided with spaced lugs, a transverse wall in said fire-box, a support arranged upon said transverse wall and having its ends walled in the side walls of said fire-box, said support being provided with a recess for receiving the rear end of said retort, side bars arranged against the side walls of said fire-box and having their rear ends mounted upon said support, the upper faces of said side bars being inclined rearwardly at the same angle of inclination as the upper edges of said retort, and provided with lugs corresponding in number and arrangement to the lugs formed on said retort and transverse plates provided with notches adapted to receive the corresponding lugs on said bars and said retort and spanning the space intermediate said retort and said side bars, said plates forming a continuous rearwardly inclined platform.

6. In a furnace and in combination with the fire-box thereof, a retort having a horizontal bottom arranged longitudinally of said fire-box, the top of said retort being inclined downwardly toward the rear end thereof, a reciprocating ram for feeding fuel into the forward end of said retort, means for preventing piling up of the fuel in the forward end of said retort, comprising an inclined plate arranged in the forward end of said retort, means for preventing packing of the fuel between said plate and said retort, comprising a bar secured to said ram and extending into said retort, said bar being provided on its upper face adjacent said ram with lugs adapted to engage the fuel, said lugs lying beneath the incline plate when the ram is at the end of its rearward stroke and a wedge shaped end on said bar adapted to engage the fuel and assist in the backward movement of the fuel bed and ashes.

7. In a furnace, and in combination with the fire-box thereof, a retort arranged longitudinally of said fire-box, a reciprocating ram for feeding fuel into the forward end of said retort, means for preventing piling of the fuel in the forward end of said retort comprising an inclined plate arranged in the forward end of said retort, means for preventing packing of the fuel intermediate said plate and said retort, means for assisting the rearward movement of the fuel bed and ashes in said retort, a water sealed chamber, a plurality of horizontally disposed rotatable tubular members mounted therein, each of said members being provided with a longitudinal opening, and means for rotating said tubular members.

8. In a furnace, and in combination with the fire-box thereof, a retort arranged longitudinally of said fire-box, a reciprocating ram for feeding fuel into the forward end of said retort, means for preventing piling of the fuel in the forward end of said retort comprising an inclined plate arranged in the forward end of said retort, means for preventing packing of the fuel intermediate said plate and said retort, means for assisting the rearward movement of the fuel bed and ashes in said retort, a water sealed chamber arranged transversely of the rear end of the fire-box, a plurality of horizontally disposed rotatable tubular members arranged crosswise or longitudinally of said chamber and partially submerged in the water therein, each of said members being provided with a longitudinal opening and means for rotating said tubular members.

9. In a furnace, and in combination with the fire-box thereof, a retort arranged longitudinally of said fire-box, a reciprocating ram for feeding fuel into the forward end of said retort, means for preventing piling of the fuel in the forward end of said retort comprising an inclined plate arranged in the forward end of said retort, means for preventing packing of the fuel intermediate said plate and said retort, means for assisting the rearward movement of the fuel bed and ashes in said retort, a water sealed chamber arranged transversely of the rear end of the fire-box, a plurality of horizontally disposed rotatable tubular members arranged crosswise or longitudinally of said chamber and partially submerged in the water therein, each of said members being provided with a longitudinal opening, and means for rotating said tubular members comprising a bar pivotally connected to one of said tubular members, a ratchet wheel mounted on said tubular member, a pawl carried by said bar and adapted to engage said ratchet wheel, a gear secured to said tubular member and meshing with similar gears secured to the remaining tubular member, and means for oscillating said pivoted bar.

10. In a furnace and in combination with the fire-box thereof, a retort having an open top and open front and rear ends arranged within the fire-box, the bottom of said retort being horizontally disposed and the top of said retort inclining downwardly toward the rear end thereof, a support arranged in the fire-box at right angles to said retort and having its ends walled in the walls thereof parallel to said retort adapted to receive the rear end of said retort, the top of said retort being substantially flush with the top of said support.

11. In a furnace and in combination with the fire-box thereof, a retort having an open top inclined toward the rear end thereof arranged within the fire-box, said retort being provided with horizontally disposed upper faces having spaced openings formed therein, twyers mounted in said openings and having their discharge openings facing the open top of said retort, side bars mounted against the walls of the fire-box and having their upper faces inclined rearwardly at the same angle of inclination as the top of said retort, lugs formed on the top of said retort, lugs formed on the upper face of said side bars and plates spanning the space between said retort and said side bars provided with notches adapted to receive the lugs formed on said side bars and said retort.

12. In a furnace and in combination with the fire-box thereof, a plurality of parallel retorts having open tops arranged therein and having their forward ends bolted to the fire-front thereof, said retorts having horizontally disposed upper faces inclining toward the rear end thereof, said faces having spaced openings formed therein, open bottomed twyers mounted in said openings and having their discharge openings facing the open tops of said retorts, side bars mounted against the side walls of the fire-box having their upper faces inclined rearwardly at the same angle of inclination as the upper faces of said retorts, spaced lugs formed on the upper faces of said retorts, lugs formed on the upper face of said side bars similar in number and arrangement to the lugs formed on the upper faces of said retorts, side plates spanning the spaces between said retorts and side bars provided with notches adapted to receive the lugs formed on the side bars and said retorts and center plates similar to said side plates spanning the spaces intermediate said retorts.

13. In a furnace and in combination with the fire box thereof, a retort having open front and rear ends arranged within the fire box, the bottom of said retort being horizontally disposed and restricted at its front end and diverging rearwardly, the top of said retort inclining downwardly toward the rear end thereof.

14. In a furnace and in combination with the fire box thereof, a retort having open front and rear ends and a horizontally disposed bottom arranged longitudinally of the fire-box, the top of said retort inclining downwardly toward the rear end thereof and being provided with horizontally disposed faces forming steps having spaced openings formed therein, twyers mounted in said openings, the bottom of said retort being restricted forwardly and diverging rearwardly.

15. In a furnace and in combination with the fire box thereof, a retort having an open top and open front and rear ends arranged within the fire-box, the bottom of said retort being horizontally disposed and the top of said retort inclining downwardly toward the rear end thereof, a support arranged transversely of the fire-box and having its ends walled in the side walls thereof adapted to receive the said retort adjacent the rear end thereof, the open rear end of said retort projecting beyond said support and the top of said retort being substantially flush with the top of said support at the point of connections.

16. In a furnace and in combination with the fire-box thereof, a retort arranged longitudinally of said fire-box, a reciprocating ram for feeding fuel into the forward end of said retort, means for preventing piling of the fuel in the forward end of said retort comprising an inclined plate arranged in the forward end of said retort, means for preventing packing of the fuel intermediate said plate and said retort, means for assisting the rearward movement of the fuel bed and ashes in said retort, a water sealed chamber disposed at the rear end of said retort means for supporting ashes and unconsumed fuel within said chamber and means for supplying air for combustion to said unconsumed fuel.

17. In a furnace and in combination with the firebox thereof, means within the fire-box to cause the fuel bed and ashes to move in one direction therein, a watersealed chamber arranged transversely of the line of movement of the fuel bed and ashes, means within the chamber and partially submerged in the water thereof for supporting the unconsumed fuel and ashes and removing the accumulating ashes, and means for supplying air for combustion to the unconsumed fuel within said chamber.

In testimony whereof I affix my signature in presence of two witnesses.

LEWIS METESSER.

Witnesses:
H. SILVERSTONE,
FLORENCE L. DIEHL.